(12) United States Patent
Spilker et al.

(10) Patent No.: US 12,534,596 B2
(45) Date of Patent: Jan. 27, 2026

(54) SULFOXIDE-CONTAINING COMPOUNDS AS CROSSLINKING AGENTS

(71) Applicant: The Goodyear Tire & Rubber Company, Akron, OH (US)

(72) Inventors: Thomas Franklin Spilker, Broadview Heights, OH (US); Frank James Feher, Copley, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 536 days.

(21) Appl. No.: 18/067,766

(22) Filed: Dec. 19, 2022

(65) Prior Publication Data
US 2024/0209183 A1    Jun. 27, 2024

(51) Int. Cl.
| | |
|---|---|
| C08K 3/04 | (2006.01) |
| B60C 1/00 | (2006.01) |
| C08F 36/06 | (2006.01) |
| C08F 36/08 | (2006.01) |
| C08K 3/36 | (2006.01) |
| C08K 5/36 | (2006.01) |
| C08K 5/41 | (2006.01) |
| C08L 7/00 | (2006.01) |
| C08L 9/00 | (2006.01) |

(52) U.S. Cl.
CPC .............. *C08K 5/36* (2013.01); *B60C 1/0016* (2013.01); *C08F 36/06* (2013.01); *C08F 36/08* (2013.01); *C08K 3/04* (2013.01); *C08K 3/36* (2013.01); *C08K 5/41* (2013.01); *C08L 7/00* (2013.01); *C08L 9/00* (2013.01)

(58) Field of Classification Search
CPC ... C08K 5/36; C08K 5/41; C08F 36/06; C08F 36/08; C08L 7/00; C08L 9/00
See application file for complete search history.

(56) References Cited

U.S. PATENT DOCUMENTS

| | | | |
|---|---|---|---|
| 4,474,908 A | 10/1984 | Wagner | |
| 5,780,538 A | 7/1998 | Cohen et al. | |
| 5,827,912 A | 10/1998 | Scholl | |
| 6,005,027 A | 12/1999 | Guillet et al. | |
| 6,121,347 A | 9/2000 | Yatsuyanagi et al. | |
| 6,136,913 A | 10/2000 | Nahmias et al. | |
| 6,573,324 B1 | 6/2003 | Cohen et al. | |
| 6,608,145 B1 | 8/2003 | Lin et al. | |
| 7,704,552 B2 | 4/2010 | Okel et al. | |
| 8,003,724 B2 | 8/2011 | Hahn et al. | |
| 8,440,750 B2 | 5/2013 | Hahn et al. | |
| 9,074,073 B2 | 7/2015 | Hahn et al. | |
| 10,947,369 B2 | 3/2021 | Hahn et al. | |
| 11,440,877 B2 | 9/2022 | Kulig et al. | |
| 2017/0051085 A1 | 2/2017 | Blok et al. | |
| 2018/0291124 A1 | 10/2018 | Anderson et al. | |
| 2020/0109222 A1 | 4/2020 | Anderson et al. | |
| 2022/0204351 A1 | 6/2022 | Hahn et al. | |

FOREIGN PATENT DOCUMENTS

| | | | | |
|---|---|---|---|---|
| KR | 20190057542 A | * | 5/2019 | .............. B01J 31/12 |

OTHER PUBLICATIONS

Xu, et al, "Spontaneous resolution of chiral bis-sulfoxides with asymmetric atropisomerism", CrystEngComm, 2014, 16, 3839-3842. (Year: 2014).*
Machine translation of KR-20190057542-A obtained from Espacenet (Year: 2019).*
Samuel Braverman, "Rearrangements involving sulfenic acids and their derivatives," Chapter 8 in the Chemistry of Sulphenic Acids and their Derivatives, pp. 311-359, Saul Patai, Ed., John Wiley (1990).
J. L. Garcia Ruano, et al., "Product Class 4: Acyclic Dialkyl Sulfoxides and Derivatives," pp. 245-390, in Kambe, N., Science of Synthesis, 39: Category 5, Compounds with One Saturated Carbon Heteroatom Bond (2008).

* cited by examiner

*Primary Examiner* — Kregg T Brooks
*Assistant Examiner* — David R. Foss
(74) *Attorney, Agent, or Firm* — Mandy B. Willis

(57) ABSTRACT

A crosslinking agent includes two or more of functional that are capable of forming a bond with an elastomer containing olefinic unsaturation. One or both of these functional groups includes a sulfoxide group. The functional groups are linked by a linking moiety. A rubber composition may include the crosslinking agent, one or more vulcanizable elastomers, and optionally other rubber-forming additives, such as reinforcing fillers, processing aids, and/or curing aids. A tire tread or other shaped object may be formed from the rubber composition.

19 Claims, No Drawings

SULFOXIDE-CONTAINING COMPOUNDS AS CROSSLINKING AGENTS

BACKGROUND

The exemplary embodiment relates to crosslinking agents. It finds particular application in connection with a compound containing at least one sulfoxide group that is capable of introducing crosslinks between elastomers, to a composition which includes the compound, to an article formed from the compound, and a method of forming the article.

Compositions for forming rubber articles generally include a crosslinking agent (or "vulcanizing agent") for forming links between elastomers containing olefinic unsaturation that form the basis of the rubber composition. Traditionally, sulfur has been used as a crosslinking agent, but more recently, multifunctional organic compounds, such as organic peroxides, azo compounds, oxime compounds, nitroso compounds, and polyamine compounds have been proposed as crosslinking agents. The nature of the crosslinks in a rubber composition can influence the properties of a vulcanized rubber article.

The exemplary embodiment allows for the introduction of different chemical moieties as crosslinks with a diene-based elastomer. These can include crosslinks of different length or chemical structure which can influence the properties of the resulting crosslinked composition.

BRIEF DESCRIPTION

In accordance with one embodiment, a crosslinking agent includes at least two functional groups which are capable of forming a bond with an associated elastomer, the elastomer containing olefinic unsaturation. One or both of the at least two functional groups include a sulfoxide group. The at least two functional groups are linked by a linking moiety.

The crosslinking agent may be a disulfoxide crosslinking agent in which the at least two functional groups each includes a sulfoxide group. The disulfoxide crosslinking agent may have the general structure of Formula (I):

Formula (I)

where X and X' are each a reactive leaving group which is capable of forming a bond with the elastomer containing olefinic unsaturation, where X and X' may be the same or different; and L represents the linking moiety.

In Formula (I), each X may independently represent a hydrocarbyl group. Each X may independently represent a hydrocarbyl group is of the general form:

where $R^1$, $R^2$, and $R^3$ are each independently H or a hydrocarbyl group.

At least one, or at least two of $R^1$, $R^2$, and $R^3$ may be an alkyl group. In one aspect, at least one of $R^1$, $R^2$, and $R^3$ is a methyl group.

In Formula (1), L may be a hydrocarbylene group, which optionally includes at least one sulfoxide group. L may have the general structure; —$(R^7)_m$—$(Ar)_n$—$(R^8)_p$—, where each of $R^7$ and $R^8$ is independently an alkylene group or alkenylene group; Ar is an optionally-substituted arylene group; each of m, n, and p is ≥0, and at least one of m, n, and p is ≥1. In one aspect, n is ≥1. In one aspect, m is 1 and p is 1. In one aspect, each of $R^7$ and $R^8$ is independently an alkylene group with a hydrogen on a β carbon.

The crosslinking agent may have the structure:

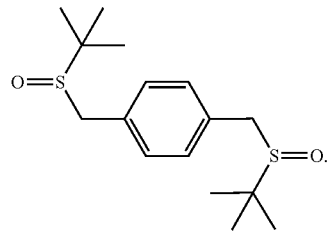 [SMILES: CC(C)(C)S(=O)Cc1ccc(CS(=O)C(C)(C)C)cc1]

In another aspect, a composition includes a product of a reaction of the crosslinking agent described above and an elastomer containing olefinic unsaturation.

In the composition, the elastomer may include at least one of polyisoprene, polybutadiene, a styrene-butadiene copolymer, and mixtures and copolymers thereof.

The composition may further include at least one reinforcing filler. The at least one reinforcing filler may include a reinforcing filler selected from carbon black, silica and mixtures thereof.

The composition may further include at least one of: at least one processing aid; and a cure package including a sulfur-based vulcanizing agent.

In another aspect, a tire is formed, at least in part, from the composition.

In accordance with another embodiment, a method of forming a rubber composition includes blending an elastomer containing olefinic unsaturation with a crosslinking agent having the general structure of Formula (I):

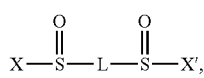

Formula (I)

where X and X' are each a reactive leaving group which is capable of forming a bond with the elastomer containing olefinic unsaturation, where X and X' may be the same or different, and L represents a linking moiety, at a temperature at which crosslinking of the elastomer by the crosslinking agent occurs.

The method may further include combining at least one of a reinforcing filler and a plasticizer with the elastomer and the crosslinking agent.

In accordance with another embodiment, a crosslinking agent has the general structure of Formula (I):

Formula (I)

where X and X' are each a reactive leaving group of the general form:

where $R^1$, $R^2$, and $R^3$ are each independently H or a hydrocarbyl group; and L is of the general form: $-(R^7)_m-(Ar)_n-(R^8)_p-$, where each of $R^7$ and $R^8$ is an alkylene group or alkenylene group, which may be the same or different, Ar is an optionally-substituted arylene group, each of m, n, and p is ≥0, and at least one of m, n, and p is ≥1.

DETAILED DESCRIPTION

Aspects of the exemplary embodiment relate to a crosslinking agent containing two or more functional groups, at least one of the functional groups being, or otherwise containing, a sulfoxide group (S=O). In particular aspects, the two or more functional groups include two or more sulfoxide groups. Each of the functional groups is capable of forming a covalent bond with a vulcanizable elastomer by reaction with a carbon-carbon double bond of the vulcanizable elastomer.

In one aspect, the crosslinking agent is a disulfoxide crosslinking agent which includes at least two sulfoxide groups, which may have the general structure of Formula (I):

Formula (I)

where X and X' are each a reactive leaving group which is capable of forming a bond with an elastomer containing olefinic unsaturation, where X and X' may be the same or different; and L is a linking moiety, such as a hydrocarbylene group, which connects the two sulfoxide groups, and which optionally may include one or more additional sulfoxide groups.

In one embodiment, X (and similarly, X') is of the general form:

where $R^1$, $R^2$, and $R^3$ are each independently H or a hydrocarbyl group, in particular, an aliphatic hydrocarbyl group, which can be the same or different. In one embodiment at least one, or at least two, or each of $R^1$, $R^2$, and $R^3$ is a hydrocarbyl group. For example, no more than one of $R^1$, $R^2$, and $R^3$ is H.

In this embodiment, the disulfoxide crosslinking agent has the general formula of Formula (II):

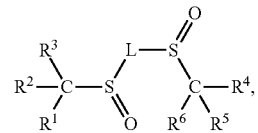

Formula (II)

where $R^1$, $R^2$, $R^3$, $R^4$, $R^5$, and $R^6$ (collectively referred to herein as the R groups) are each independently H or a hydrocarbyl group, in particular, an aliphatic hydrocarbyl group, which can be the same or different.

As used herein, the term "hydrocarbyl group" is used in its ordinary sense. Specifically, it refers to a group having a carbon atom directly attached to the remainder of the molecule and having predominantly hydrocarbon character. By predominantly hydrocarbon character, it is meant that at least 60%, or at least 70%, or at least 80% of the atoms in the group are selected from hydrogen and carbon. Heteroatoms which may be incorporated in a hydrocarbyl group include sulfur, oxygen, nitrogen, and halogens, and encompass substituents, such as sulfoxide, pyridyl, furyl, thienyl and imidazolyl. In general, no more than two, and in one embodiment, no more than one, non-hydrocarbon substituent will be present in the hydrocarbyl group. In some embodiments, there are no non-hydrocarbon substituents in the hydrocarbyl group.

Each of the R groups that are hydrocarbyl groups may include from 1-30 carbon atoms.

Examples of hydrocarbyl groups useful as the R groups include:

(i) hydrocarbon groups, that is, aliphatic (e.g., alkyl or alkenyl), alicyclic (e.g., cycloalkyl, cycloalkenyl) groups, aryl groups, and aryl-, aliphatic-, and alicyclic-substituted aryl groups, as well as cyclic groups wherein the ring is completed through another portion of the molecule (e.g., two substituents together form a ring);

(ii) hetero-substituted hydrocarbon groups, that is, groups containing non-hydrocarbon groups (e.g., halo (especially chloro and fluoro), hydroxy, alkoxy, mercapto, alkylmercapto, nitro, nitroso, and sulfoxy), such as heteroaliphatic, heteroalicyclic, heteroaryl, and heteroaryl-, heteroaliphatic-, and heteroalicyclic-substituted aryl groups;

(iii) hetero substituents, that is, substituents which, while having a predominantly hydrocarbon character, may contain other than carbon in a ring or chain otherwise composed of carbon atoms.

Hydrocarbylene groups, useful as L, are the divalent equivalents of hydrocarbyl groups, and may include alkylene groups, cycloalkylene groups, arylene groups, alkylarylene groups, arylalkylene and heterocycloalkylene groups, and other divalent equivalents of the hydrocarbyl groups listed above.

Representative aliphatic groups useful as R groups (i.e., $R^1$, $R^2$, $R^3$, $R^4$, $R^5$, and $R^6$) may contain from 1 to 30 carbon atoms, e.g., at least 2 carbon atoms, or at least 3 carbon atoms, or up to 24 carbon atoms, or up to 20 carbon atoms, or up to 16 carbon atoms, or up to 10 carbon atoms. Examples of suitable alkyl groups include methyl, ethyl, n-propyl, isopropyl, n-butyl, isobutyl, sec-butyl, n-pentyl, isopentyl, neopentyl, n-hexyl, n-heptyl, n-octyl, iso-octyl, secondary octyl, 2-ethylhexyl, n-nonyl, secondary nonyl, decyl, iso-decyl, undecyl, dodecyl, 2-propylheptyl, tridecyl, isotridecyl, tetradecyl, 4-methyl-2-pentyl, propyl heptyl, hexadecyl, secondary hexadecyl, stearyl, icosyl, docosyl, tetracosyl, 2-butyloctyl, 2-butyldecyl, 2-hexyloctyl, 2-hexydecyl, 2-octyldecyl, 2-hexyldodecyl, 2-octyldodecyl, and the like.

Representative hetero-substituted aliphatic groups useful as R groups may contain from 1 to 30, or up to 24 carbon atoms, such as polyethylene glycol, polyethylene imine, and the like.

Representative alkenyl groups useful as R groups may contain from 2 to 30, or up to 24 carbon atoms, e.g., at least 3 carbon atoms, or at least 4 carbon atoms, or up to 20 carbon atoms, or up to 16 carbon atoms, or up to 10 carbon atoms. Examples of suitable alkenyl groups include mono- and di-saturated alkenyl groups, such as ethenyl, 2-propenyl, and saturated equivalents of the other alkyl groups exemplified above.

Representative cycloalkyl groups useful as R groups include cyclic versions of alkyl groups that are not aromatic and include monocyclic, bicyclic, and multicyclic cycloalkyl ring systems. Cycloalkyl groups may contain from 3 to 30 carbon atoms. Examples of cycloalkyl groups include cyclopropyl, cyclobutyl, cyclopentyl, cyclohexyl, 1-cyclohexenyl, 3-cyclohexenyl, cycloheptyl, and the like.

A heterocycloalkyl group contains a heteroatom, which can occupy the position at which the heterocycle is attached to the remainder of the molecule. Representative heterocycloalkyl groups useful as R groups include hetero-atom-containing versions of cycloalkyl groups that are not aromatic and include monocyclic, bicyclic, and multicyclic heterocycloalkyl ring systems. Heterocycloalkyl groups may contain from 3 to 30 carbon atoms. Examples of heterocycloalkyl include 1-(1,2,5,6-tetrahydropyridyl). 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, and the like.

Representative aryl groups, alkylaryl groups, and cycloalkylaryl groups useful as R groups include phenyl, toluyl, xylyl, cumenyl, mesityl, benzyl, 1,4-diethylbenzyl, phenethyl, styryl, cinnamyl, benzhydryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl, benzylphenyl, styrenated phenyl, p-cumylphenyl, α-naphthyl, β-naphthyl groups, and mixtures thereof.

In one embodiment, some or all of the R groups ($R^1$, $R^2$, $R^3$, $R^4$, $R^5$, and $R^6$) is independently an aliphatic hydrocarbyl group, selected from alkyl, alkenyl, and alicyclic groups, as described above for such hydrocarbyl groups. In one specific embodiment, each R group is independently an alkyl group. In one embodiment, each R group is independently an alkyl group of no more than 16 carbon atoms, or no more than 12 carbon atoms. In one embodiment, at least one of $R^1$, $R^2$, and $R^3$ is no more than five, or no more than three, or only two, or only one carbon atom. In particular, at least one of $R^1$, $R^2$, and $R^3$ may be a methyl group for ease of elimination of a compound of formula $R^1$=C($R^2$) $R^3$ from the disulfoxide crosslinking agent. As an illustrative example, $R^1$ is $CH_3$, $R^2$ is $CH_3$, and $R^3$ is $C_9H_{19}$. Similarly, in one embodiment, at least one of $R^4$, $R^5$, and $R^6$ is no more than five, or no more than three, or only two, or only one carbon atom, e.g., $R^4$ is $CH_3$, $R^5$ is $CH_3$, and $R^6$ is $C_9H_{19}$. As another illustrative example, $R^1$ is $CH_3$, $R^2$ is $CH_3$, and $R^3$ is H and $R^4$ is $CH_3$, $R^5$ is $CH_3$, and $R^6$ is H.

The linking moiety L can be the hydrocarbylene equivalent of any of the hydrocarbyl groups exemplified as R groups. In one embodiment, L includes at least 1, or at least 2, or at least 3, or at least 6, or at least 10 carbon atoms, or up to 30 carbon atoms, or up to 24 carbon atoms, or up to 20 carbon atoms, or up to 16 carbon atoms. The hydrocarbylene linking group L may be selected from $C_2$-$C_{24}$ hydrocarbylene groups, such as $C_3$ and higher hydrocarbylene groups, as described above, and in particular, from $C_2$-$C_{24}$ alkylene groups, $C_2$-$C_{24}$ alkylenylene groups, $C_4$-$C_{24}$ cycloalkylene groups, $C_3$-$C_{24}$ heterocycloalkylene groups, $C_6$-$C_{24}$ arylene groups, and $C_6$-$C_{24}$ alkylarylene groups.

Suitable alkylene groups have at least one hydrogen on each β carbon atom, where the B carbon atom is the carbon atom that is directly attached to the carbon atom which is directly attached to the respective sulfoxide group. Example L groups of this type include straight chain $C_3$, $C_4$, $C_5$, and $C_6$ hydrocarbylene groups of the form —$(CH_2)_p$—, where p may be from 2-24, and branched hydrocarbylene groups in which there is at least one H on each β carbon atom. Additionally, each α-carbon may be a $CH_2$ group. Examples of suitable L groups of this type include —$CH_2CH_2CH_2$—, —$CH_2CH(CH_3)CH_2$—, and the like.

In one aspect, the linking moiety L is of the form: —$(R^7)_m$—$(Ar)_n$—$(R^8)_p$—, where each of $R^7$ and $R^8$ is an alkylene group or alkenylene group, which may be the same or different, Ar is an optionally-substituted arylene group, each of m, n, and p is ≥0, and at least one of m, n, and p is ≥1. In one aspect, n is ≥1. In one aspect, at least one of m and p=1, e.g., m=n=p=1. In one aspect each of m, n, and p is ≤ 1.

In one embodiment, each of the sulfoxide groups that are directly attached to a reactive leaving group in Formula (I) is not directly linked to an arylene group.

In some embodiments, L may include an arylene group that is spaced from each sulfoxide group shown in Formula (I) by at least one carbon atom, or at least two carbon atoms. For example, at least one of $R^7$ and $R^8$ may be an alkylene group, such as a straight chain or branched $C_1$-$C_{12}$ alkylene group. Examples of alkylene groups useful as $R^7$ and $R^8$ include methylene, ethylene, n-propylene, n-butylene, and the like. For example, L may be selected from groups having the general form: —$CH_2$—$(CH_2)_s$—$(Ar)$—$(CH_2)_t$—$CH_2$—, where s and t are each at least 1, such as up to 8, or up to 5, and Ar is an arylene group, as described above, such as —$C_6H_4$— or a substituted derivative thereof.

The Ar group in L may have the general formula:

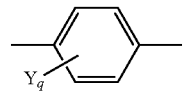

where each Y is a hydrocarbyl group or a sulfoxide-containing group, which may be the same or different, and q is from 0-4.

For example, at least one Y is an alkyl sulfoxide group. E.g., Ar may be selected from:

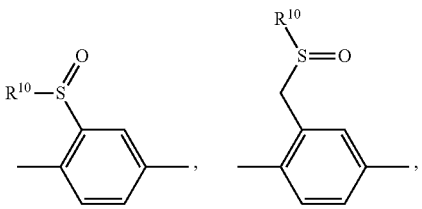

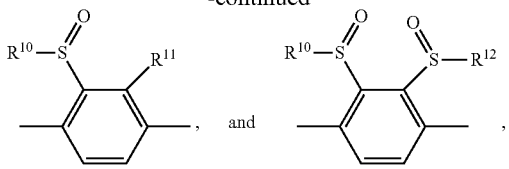

where each of $R^{10}$, $R^{11}$, and $R^{12}$ is independently H or a $C_1$-$C_{12}$ alkyl group.

In one embodiment, the crosslinking agent is thus of the general form:

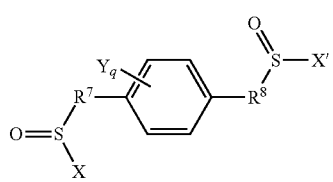

As an example, in one specific embodiment, the disulfoxide crosslinking agent has the structure:

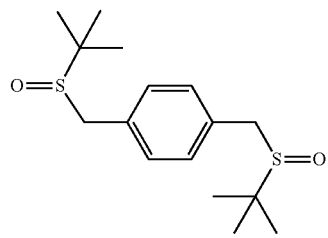 [SMILES: CC(C)(C)S(=O)Cc1ccc(CS(=O)C(C)(C)C)cc1]

As will also be appreciated, Ar can be a diaryl or polyaryl group, which may include one or more heteroatoms in one or more of the rings and may be substituted by one or more Y groups in one or more of the rings.

In some embodiments, the linking moiety can be a substituted hydrocarbylene containing one or more Example heteroatoms may include S, O, Si, Cl, F, Br, and N. Such heteroatoms can be in the form of reactive groups or substantially inert. Example reactive group(s) may be selected from hydroxyl, sulfoxide, organofunctional silane groups containing one or more reactive groups (e.g., halide, sulfoxide) attached to the silicon atom, and mixtures thereof.

In one embodiment, the crosslinking agent is free of metal atoms.

Method of Preparing the Crosslinking Agent

As an example, the exemplary crosslinking agent can be prepared by reaction of a dichloroalkyl aryl compound with a trialkyl thiol and then oxidizing the sulfur groups to generate sulfoxide group. The reaction of a dichloroalkyl aryl compound with a trialkyl thiol may be performed in an organic solvent, such as hexane, dichloromethane, toluene or diethyl ether. Temperatures for this reaction may be 0° C. to 120° C. or 20° C. to 60° C. The oxidation of sulfur to a sulfoxide may be performed using a peroxy acid, such as peroxyacetic acid or meta-chloroperoxybenzoic acid, in an organic solvent such as diethyl ether or dichloromethane at temperatures from −40° C. to 60° C. or from temperatures from 0° C. to 25° C. Other methods for conversion of the sulfur group are well known, as described, for example, in J. L. GARCÍA RUANO, et al., "Product Class 4; Acyclic Dialkyl Sulfoxides and Derivatives," pp. 245-390, in Kambe, N., Science of Synthesis, 39: Category 5, Compounds with One Saturated Carbon Heteroatom Bond (2008).

An illustrative reaction scheme is as follows:

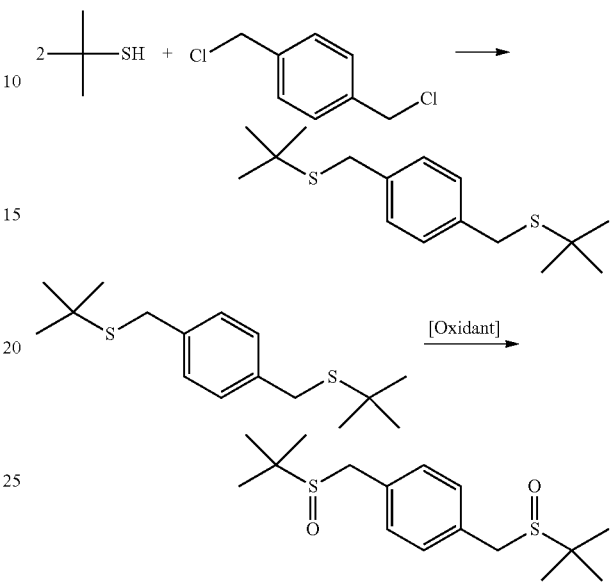

Crosslinking Elastomers with the Crosslinking Agent

The exemplary disulfoxide crosslinking agent is capable of linking two or more molecules of an elastomer containing olefinic unsaturation. As used herein the term "elastomer containing olefinic unsaturation" (or "rubber") is intended to encompass both natural rubber and its various raw and reclaimed forms as well as various synthetic rubbers.

For example, the illustrative disulfoxide crosslinking agent reacts with unsaturated units of an elastomer as follows:

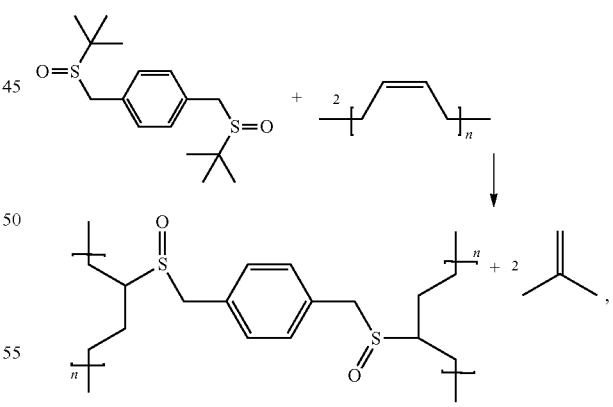

wherein in the elastomer, each n may be an integer which is at least 2, or at least 3, such as at least 10, or at least 50, or up to 100,000.

The reaction may be carried out at a suitable temperature for crosslinking to occur, such as from 100° C. to 200° C., or from 110° C. to 180° C., optionally in the presence of a vulcanizing accelerator.

It is to be appreciated that the unsaturated elastomer may additionally or alternatively incorporate monomer units other than the butadiene unit illustrated and/or that the disulfoxide crosslinking agent may be coupled to fewer than all the unsaturated groups in the elastomer.

Examples of the other monomer units which may be incorporated in the unsaturated elastomer in addition to, or as an alternative to butadiene, include those derived from isoprene, dimethyl butadiene, styrene, methyl styrene, acrylate monomers, methacrylate monomer, and the like.

In some embodiments, the elastomer may include one or more of natural rubber, synthetic polyisoprene, natural polyisoprene, styrene-butadiene copolymer, solution-polymerized styrene-butadiene (SSBR), emulsion-polymerized styrene-butadiene rubber (ESBR), butadiene rubber (BR), halobutyl rubber, bromobutyl rubber, chlorobutyl rubber, nitrile rubber, liquid rubbers, polynorbornene copolymer, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene terpolymer, hydrated acrylonitrile butadiene rubber, isoprene-butadiene copolymer, butyl rubber, hydrogenated styrene-butadiene rubber, butadiene acrylonitrile rubber, a terpolymer formed from ethylene monomers, propylene monomers, and/or ethylene propylene diene monomer (EPDM), isoprene-based block copolymers, butadiene-based block copolymers, styrenic block copolymers, styrene-butadiene-styrene block copolymer (SBS), styrene-ethylene/butylene-styrene block copolymer (SEBS), styrene-[ethylene-(ethylene/propylene)]-styrene block copolymer (SEEPS), styrene-isoprene-styrene block copolymer (SIS), random styrenic copolymers, hydrogenated styrenic block copolymers, styrene butadiene copolymers, polyisobutylene, ethylene vinyl acetate (EVA) polymers, polyolefins, amorphous polyolefins, semi-crystalline polyolefins, alpha-polyolefins, reactor-ready polyolefins, acrylates, metallocene-catalyzed polyolefin polymers and elastomers, reactor-made thermoplastic polyolefin elastomers, olefin block copolymer, co-polyester block copolymer, polyurethane block copolymer, polyamide block copolymer, thermoplastic polyolefins, thermoplastic vulcanizates, ethylene vinyl acetate copolymer, ethylene n-butyl acrylate copolymer, ethylene methyl acrylate copolymer, neoprene, acrylics, urethane, poly(acrylate), ethylene acrylic acid copolymer, polyether ether ketone, polyamide, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, $C_4$-$C_{10}$ alpha-olefin monomers, polypropylene polymers, maleated polyolefins, polyester copolymers, copolyester polymers, ethylene acrylic acid copolymer, and/or polyvinyl acetate, and/or wherein the polymer optionally comprises a modification and/or functionalization selected from one or more of hydroxyl-, ethoxy-, epoxy-, siloxane-, amine-, aminesiloxane-, carboxy-, phthalocyanine-, and silane-sulfide-groups, at the polymer chain ends or pendant positions within the polymer.

Rubber Compositions

The term "rubber composition, as used herein," refers to a mixture of rubber (elastomer), a crosslinking agent or agents which include the exemplary disulfoxide crosslinking agent, and generally one or more additional additives, such as reinforcing fillers, processing aids, vulcanization accelerators, and the like. In one embodiment, the rubber composition may be free of conventional sulfur-based vulcanizing agents.

As used herein, the term "phr" means parts per one hundred parts rubber, where the term "rubber" encompasses the exemplary elastomer described herein, in either its uncured or crosslinked (vulcanized) state. In general, using this convention, a rubber composition comprises 100 parts by weight of rubber. The claimed composition may comprise other polymers than explicitly mentioned in the claims, provided that the phr value of the rubber is 100.

Reinforcing Fillers

Example reinforcing fillers suitable for use in rubber compositions include various forms of carbon, such as carbon black, carbon nanotubes, and graphene; and inorganic oxides, such as silica (e.g., precipitated or fumed), aluminosilicates, aluminum hydroxide, clay (reinforcing grades), magnesium hydroxide, boron nitride, aluminum nitride, titanium dioxide, and reinforcing zinc oxide (which may be generally referred to herein as mineral oxide fillers), and mixtures thereof. Reinforcing fillers may be used in a total amount of at least 1 phr, or at least 5 phr, or at least 10 phr, or up to 250 phr, or up to 200 phr, or up to 160 phr.

Example silica-containing fillers for use in rubber compositions include pyrogenic and precipitated silicas. Such silicas may be characterized by having a CTAB surface area in the range of 40 to 600 $m^2$/g, such as at least 100 $m^2$/g or up to 450 $m^2$/g. The CTAB surface area is measured according to ASTM D6845-20 "Standard Test Method for Silica, Precipitated, Hydrated-CTAB (Cetyltrimethylammonium Bromide) Surface Area." This test method covers the measurement of the specific surface area of precipitated silica, exclusive of area contained in micropores too small to admit hexadecyltrimethylammonium bromide (cetyltrimethylammonium bromide, commonly referred to as CTAB) molecules. The silica particles may have an average particle size (mean diameter) of 0.01 to 0.05 micron as determined by an electron microscope, although the silica particles may be even smaller, or larger, in size.

Various commercially available silicas may be used, such as silicas commercially available from PPG Industries under the Hi-Sil trademark with designations 210 and 243; silicas available from Rhodia, with, for example, designations of Z1165MP and Z165GR, silicas available from Degussa AG with, for example, designations VN2 and VN3, and silicas from Solvay, e.g., sold as Zeosil™ Premium SW and Premium 200 MP.

The silica particles may be functionalized, e.g., with thiol groups, and/or have been pretreated with an organosilane. The organosilane is generally one which increases the hydrophobic character of the silica particles, making it more dispersible in the elastomer(s). Examples of organosilanes include alkylsilanes, which may be halogenated, alkoxylated, and or contain polysulfide groups. Example organosilanes are described, for example, in U.S. Pat. Nos. 4,474,908, 5,780,538, 6,573,324, 8,003,724, 9,074,073 and 11,440,877, and U.S. Pub. No. 20220204351.

The optionally-pretreated silica particles (or other mineral filler) may be combined with the elastomer(s) in amounts ranging from 4 phr to 250 phr, or at least 15 phr, or up to 150 phr.

The amount of carbon black, where used, may range from 5 phr to 200 phr, such as at least 10 phr or up to 80 phr, or up to 50 phr. It is to be appreciated that the silane coupling agent may be used in conjunction with a carbon black, namely pre-mixed with a carbon black prior to addition to a rubber composition. In one embodiment, the total amount of silica and carbon black is at least about 30 phr, such as at least 45 phr or up to 130 phr. A ratio of carbon black to silica in the composition may range from 1:100 to 100:1, by weight, such as at least 10:90, or at least 20:80, or up to 90:10, or up to 80:20.

The carbon black may have a CTAB specific surface area of at least 100, or at least 102, or at least 104, or up to 120, or up to 118, or up to 116 m$^2$/kg. Exemplary carbon blacks useful herein include ASTM designations N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991, as specified by ASTM D1765-21, "Standard Classification System for Carbon Blacks Used in Rubber Products." These carbon blacks may have iodine absorptions ranging from 9 to 145 g/kg and a DBP number ranging from 34 to 150 cm$^3$/100 g.

Processing Aids

Processing aids may be used at a total of at least 4 phr, or up to 100 phr, and may include one or more of liquid plasticizers, resins, waxes, antioxidants, antidegradants, antiozonants, and materials which provide two or more of these functionalities.

The term liquid plasticizer is used to refer to plasticizer ingredients which are liquid at room temperature (i.e., liquid at 25° C. and above). Hydrocarbon resins, in contrast to plasticizers, are generally solid at room temperature. Generally, liquid plasticizers have a Tg that is below 0° C., generally well below 0° C., such as less than –30° C., or less than –40° C., or less than –50° C., such as a Tg of 0° C. to –100° C.

Suitable liquid plasticizers include oils (e.g., petroleum-based hydrocarbon oils as well as plant-sourced oils) and non-oil liquid plasticizers, such as ether plasticizers, ester plasticizers, phosphate plasticizers, and sulfonate plasticizers. Liquid plasticizer may be added during the compounding process or later, as an extender oil (which is used to extend a rubber). Petroleum based oils may include aromatic, naphthenic, low polycyclic aromatic (PCA) oils, and mixtures thereof. Plant oils may include oils harvested from vegetables, nuts, seeds, and mixtures thereof, such as triglycerides.

Suitable low PCA oils include those having a polycyclic aromatic content of less than 3 wt. % by weight as determined by the IP346 method (Standard Methods for Analysis & Testing of Petroleum and Related Products and British Standard 2000 Parts, 2003, 62nd edition, published by the Institute of Petroleum, UK). Exemplary petroleum sourced low PCA oils include mild extraction solvates (MES), treated distillate aromatic extracts (TDAE), TRAE, and heavy naphthenics. Exemplary MES oils are available commercially as CATENEXT SNR from Shell, PROREX™ 15 and FLEXON™ 843 from ExxonMobil, and VIVATEC™ 200 from H&R Group. Exemplary TDAE oils are available as TYREX™ 20 from ExxonMobil, and VIVATEC™ 500 and VIVATEC™ 180 from H&R Group. Exemplary heavy naphthenic oils are available as SHELLFLEX™ 794 from Shell, and Hyprene™ Black Oil from Ergon. Exemplary plant-sourced oils include soy or soybean oil, sunflower oil (including high oleic sunflower oil), safflower oil, corn oil, linseed oil, cotton seed oil, rapeseed oil, cashew oil, sesame oil, *camellia* oil, jojoba oil, macadamia nut oil, coconut oil, and palm oil.

Exemplary ether plasticizers include polyethylene glycols, polypropylene glycols, and polybutylene glycols, including triesters and diesters of carboxylic acid, phosphoric acid, or sulphonic acid, and mixtures of these triesters. More specifically, exemplary carboxylic acid ester plasticizers include compounds selected from the group consisting of trimellitates, pyromellitates, phthalates, 1,2-cyclohexanedicarboxylates, adipates, azelates, sebacates, glycerol triesters, and mixtures thereof. Exemplary glycerol triesters include those which include at least 50 wt. % by weight, or at least 80 wt. % of an unsaturated C18 fatty acid (e.g., oleic acid, linoleic acid, linolenic acid, and mixtures thereof). Other exemplary carboxylic acid ester plasticizers include stearic acid esters, ricinoleic acid esters, phthalic acid esters (e.g., di-2-ethylhexyl phthalate and diisodecyl phthalate), isophthalic acid esters, tetrahydrophthalic acid esters, adipic acid esters (e.g., di(2-ethylhexyl)adipate and diisooctyl adipate), malic acid esters, sebacic acid esters (e.g., di(2-ethylhexyl)sebacate and diisooctyl sebacate), and fumaric acid esters. Exemplary phosphate plasticizers include those with a tri-hydrocarbyl phosphate or di-hydrocarbyl phosphate structure (where each hydrocarbyl is independently selected from $C_1$ to $C_{12}$ alkyl groups and substituted and un-substituted $C_6$ to $C_{12}$ aromatic groups. More specifically, exemplary phosphate plasticizers include trimethyl phosphate, triethyl phosphate, tributyl phosphate, trioctyl phosphate, dioctyl phosphate, 2-ethylhexyl diphenyl phosphate, tributoxyethyl phosphate, triphenyl phosphate, cresyl diphenyl phosphate, isodecyl diphenyl phosphate, tricresyl phosphate, tritolyl phosphate, trixylenyl phosphate, tris(chloroethyl) phosphate, and diphenyl mono-o-xenyl phosphate. Exemplary sulfonate plasticizers include sulfonic acid esters, such as sulfone butylamide, toluenesulfonamide, N-ethyl-toluenesulfonamide, and N-cyclohexyl-p-toluenesulfonamide.

The Tg of the oil or oils used may be –40° C. to –100° C.

The rubber composition may include at least 5 phr, or up to 70 phr of liquid plasticizer, or up to 40 phr of liquid plasticizer. In other embodiments, liquid plasticizers are absent from the rubber composition.

Suitable resins include hydrocarbon resins. Example hydrocarbon resins include aromatic, aliphatic, and cycloaliphatic resins, including terpenes and terpenoids. The hydrocarbon resin may have a Tg of at least 0° C., or at least 30° C., or up to 125° C., or up to 50° C. Hydrocarbon resin Tg can be determined by DSC, according to the procedure discussed above for elastomer Tg measurements. The hydrocarbon resin may have a softening point of at least 70° C., or up to 100° C. The softening point of a hydrocarbon resin is generally related to the Tg. The Tg is generally lower than its softening point, and the lower the Tg the lower the softening point.

In one embodiment, the hydrocarbon resin, where used, is present in the rubber composition in a total amount of at least 1 phr, at least 2 phr, at least 3 phr, or at least 5 phr, or up to 70 phr, or up to 50 phr, or up to 40 phr, or up to 30 phr, or up to 20 phr, or up to 10 phr. In other embodiments, hydrocarbon resins are absent from the rubber composition.

Examples of aliphatic resins include C5 fraction homopolymer and copolymer resins. Examples of cycloaliphatic resins include cyclopentadiene ("CPD") homopolymer or copolymer resins, dicyclopentadiene ("DCPD") homopolymer or copolymer resins, and combinations thereof.

Examples of aromatic resins include aromatic homopolymer resins and aromatic copolymer resins. An aromatic copolymer resin refers to a hydrocarbon resin which comprises a combination of one or more aromatic monomers in combination with one or more other (non-aromatic) monomers, with the majority by weight of all monomers generally being aromatic.

Specific examples of aromatic resins include coumarone-indene resins, alkyl-phenol resins, and vinyl aromatic homopolymer or copolymer resins. Examples of alkyl-phenol resins include alkylphenol-acetylene resins such as p-tert-butylphenol-acetylene resins, alkylphenol-formaldehyde resins (such as those having a low degree of polymerization). Vinyl aromatic resins may include one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene and the like. Examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin).

Other aromatic resins include terpene resins, such as alpha-pinene resins, beta-pinene resins, limonene resins (e.g., L-limonene, D-limonene, dipentene which is a racemic mixture of L- and D-isomers), beta-phellandrene, delta-3-carene, delta-2-carene, and combinations thereof.

In one embodiment, the hydrocarbon resin includes a combination of aromatic and aliphatic/cycloaliphatic hydrocarbons. In such cases, the total amount of any aliphatic and/or cycloaliphatic resin used in combination with the aromatic resin may be no more than 5 phr, or less than 4 phr, or less than 3 phr, or more than 20% by weight, or no more than 15% or no more than 10% by weight of the overall amount of hydrocarbon resins.

The aromatic resin may have a Mw of at least 1000 grams/mole and/or up to 4000 grams/mole.

Other example resins which may be used in the rubber composition include tackifying resins, such as unreactive phenol formaldehyde, and stiffness resins, such as reactive phenol formaldehyde resins and resorcinol or resorcinol and hexamethylene tetramine, which may be used at 1 to 10 phr, with a minimum tackifier resin, if used, being 1 phr and a minimum stiffener resin, if used, being 3 phr. Other resins include benzoxazine resins, as described in U.S. Pub. No. 20220195153 to Papakonstantopoulos, et al.

A total amount of resin in the rubber composition may be at least 1 phr, or at least 5 phr, or up to 50 phr, or up to 20 phr, or up to 10 phr. In other embodiments, resins are absent from the rubber composition.

Suitable waxes, particularly microcrystalline waxes, may be of the type shown in The Vanderbilt Rubber Handbook (1978), pp. 346 and 347. Example waxes include C22-C60 saturated hydrocarbons, which may be branched or unbranched, and mixtures thereof. The wax(es), where used, may be present in the rubber composition at 1 to 5 phr. In other embodiments, waxes are absent from the rubber composition.

The waxes used may serve as antiozonants.

Exemplary antioxidants include amine based antioxidants, such as paraphenylenediamines (PPDs), e.g., diphenyl-p-phenylenediamine, N-(1,3-dimethylbutyl)-N'-phenyl-p-phenylenediamine (6PPD), diphenyl-p-phenylenediamine, and others, such as those disclosed in The Vanderbilt Rubber Handbook (1978), pages 344-346. Such antioxidants may also serve as antiozonants and may be used at from 0.1 to 5 phr, such as at least 0.3 phr, or at least 1 phr, or up to 3 phr. In other embodiments, antioxidants, such as paraphenylenediamines, are absent from the rubber composition.

Antidegradants, where used, may include amine based antidegradants and phenol-containing antidegradants, and may be used at from 1 to 5 phr. In other embodiments, antidegradants are absent from the rubber composition.

Phenol-containing antidegradants include polymeric hindered phenol antioxidants, and others, such as those included in The Vanderbilt Rubber Handbook (1978), pages 344-347.

Vulcanization Aids

The vulcanization is conducted in the presence of the exemplary disulfoxide crosslinking agent and optionally other crosslinking agents, such as a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Sulfur vulcanizing agents, when used, may be present in the rubber composition in an amount ranging from about 0.5 to about 10 phr.

Cure accelerators and activators act as catalysts for the vulcanization agent. Accelerators are used to control the time and/or temperature required for vulcanization and to improve the properties of the vulcanizate. In one embodiment, a single accelerator system may be used, i.e., primary accelerator. A primary accelerator may be used in amounts ranging from 0.5 to 3 phr. In another embodiment, combinations of two or more accelerators may be used. In this embodiment, a primary accelerator is generally used in the larger amount (0.5 to 2 phr), and a secondary accelerator is generally used in smaller amounts (0.05 to 0.50 phr), in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures.

Representative examples of cure accelerators include amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound, although a second sulfenamide accelerator may be used.

Examples of such cure accelerators include thiazole and/or sulfenamide vulcanization accelerators, such as 2-mercaptobenzothiazole, 2,2'-dithiobis(benzothiazole) (MBTS), N-cyclohexyl-2-benzothiazole-sulfenamide (CBS), and N-tert-butyl-2-benzothiazole-sulfenamide (TBBS), guanidine vulcanization accelerators, such as diphenyl guanidine (DPG), and mixtures thereof. In tread compositions, thiuram accelerators may be omitted.

The amount of the vulcanization accelerator may be from 0.1 to 10 phr, e.g., at least 0.5 phr, or at least 1 phr, or up to 5 phr. In other embodiments, vulcanization accelerators are absent from the rubber composition.

Vulcanizing activators are additives used to support vulcanization. Generally, vulcanizing activators include both an inorganic and organic component. Zinc oxide is the most widely used inorganic vulcanization activator. Organic vulcanization activators include stearic acid, palmitic acid, lauric acid, zinc salts of each of the foregoing, and thiourea compounds, e.g., thiourea, and dihydrocarbylthioureas such as dialkylthioureas and diarylthioureas, and mixtures thereof. Specific thiourea compounds include N,N'-diphenylthiourea, trimethylthiourea, N,N'-diethylthiourea (DEU), N,N'-dimethylthiourea, N,N'-dibutylthiourea, ethylenethiourea, N, N'-diisopropylthiourea, N,N'-dicyclohexylthiourea, 1,3-di(o-tolyl)thiourea, 1,3-di(p-tolyl) thiourea, 1,1-diphenyl-2-thiourea, 2,5-dithiobiurea, guanylthiourea, 1-(1-naphthyl)-2-thiourea, 1-phenyl-2-thiourea, p-tolylthiourea, and o-tolylthiourea.

The amount of inorganic vulcanization activator may be from 0.1 to 6 phr, or at least 0.5 phr, or at least 1 phr, or up to 4 phr. The amount of organic vulcanization activator may be from 0.1 to 10 phr, or at least 0.5 phr, or at least 1 phr, or at least 4 phr, or up to 8 phr. In other embodiments, one or both of inorganic and organic vulcanization activators are absent from the rubber composition.

Free radical initiators, which may be used in some embodiments, are sometimes known as redox initiators, and include combinations of chelated iron salts, sodium formaldehyde sulfoxylate, and organic hydroperoxides. Representative organic hydroperoxides include cumene hydroperoxide, paramenthane hydroperoxide, and tertiary butyl hydroperoxide. The free radical initiator may be used in combination with, or as an alternative to, a sulfur-based vulcanizing agent. The amount of free radical initiator, where used, may be 0.1 to 4 phr, or 0.5 to 2 phr. In other embodiments, free radical initiators are absent from the rubber composition.

Vulcanization inhibitors are used to control the vulcanization process and generally retard or inhibit vulcanization until the desired time and/or temperature is reached. Example vulcanization inhibitors include cyclohexylthiophthalimide.

The amount of vulcanization inhibitor, where used, may be 0.1 to 3 phr, or 0.5 to 2 phr. In other embodiments, vulcanization inhibitors are absent from the rubber composition.

Example rubber compositions are shown in Table 1.

TABLE 1

Example Rubber Compositions

| Component | Example A | Example B |
|---|---|---|
| Unsaturated polymer | 100 phr | 100 phr |
| Disulfoxide crosslinking agent | | |
| Silica | 4-250 phr | 10-150 phr |
| Silanes | 4-16 phf | 6-12 phf |
| Carbon black | 2-200 phr | 5-80 phr |
| Processing aids (e.g., liquid plasticizer, resin, wax, antioxidants, antidegradants, antiozonants) | 4-100 phr | 10-50 phr |
| Cure Package (e.g., sulfur vulcanizing agent (optional), cure accelerator, cure activator, zinc oxide) | 1-30 phr | 5-20 phr |

Forming a Rubber Composition

To form a cured rubber composition, one or more non-productive mixing stages is/are followed by a productive mixing stage, and finally a vulcanization stage, in which the rubber composition is cured, e.g., to form a shaped product, such as a tire tread.

The non-productive stages are intended to mix the polymer(s) and other rubber forming additives (as exemplified above, but excluding at least the vulcanizing agent and generally any accelerator(s)). In particular, the reinforcing filler(s) are mixed with the elastomer(s), to blend them thoroughly. The non-productive stages may be performed at a suitable temperature of 140-200° C., with the mixture being allowed to cool between each of the non-productive stages. The number of non-productive stages may depend on the amount of filler(s) to be incorporated, with higher filler amounts generally involving a greater number of non-productive stages, e.g., up to three, or in some cases, four or more.

In the productive mixing step, i.e., when the vulcanization agent is added, the temperature is generally maintained at a temperature below that at which curing occurs to any substantial degree, e.g., no more than 120° C., such as 40° C. to 120° C., or 60° C. to 110° C. The rubber composition may then be cured at a temperature at which vulcanization occurs, e.g., at temperatures ranging from 100° C. to 200° C., or from 110° C. to 180° C. Any of the usual vulcanization processes may be used, such as heating in a press or mold, or heating with superheated steam or hot air. For example, tires can be built, shaped, molded and cured by various methods which are known and will be readily apparent to those having skill in such art.

The exemplary disulfoxide crosslinking agent can be incorporated before the first non-productive mixing stage, during one or more of the non-productive mixing stages, during the productive mixing stage, during the vulcanization stage, or in more than one of these stages. In one embodiment, the crosslinking agent may be combined separately with the mineral filler and/or unsaturated polymer prior to being mixed with other rubber forming additives. In another embodiment, the disulfoxide crosslinking agent is added to the mixer with the filler, unsaturated polymer, and one or more rubber forming additives in one or more of the non-productive mixing stages. In another embodiment, the disulfoxide crosslinking agent is added to the mixer after the non-productive mixing stage(s), such as in the productive mixing stage. When the crosslinking agent is added before or during the productive mixing stage(s), these mixing stages may be relatively short (e.g., about two minutes) to avoid significant crosslinking of the elastomers.

Zinc oxide, where used as an activator in the rubber composition, may react with the sulfoxide group of the disulfoxide crosslinking agent, to form zinc sulfide or zinc thiolate. These compounds are inert (do not revert to zinc oxide) and can also affect the viscosity of the batch. Accordingly, it is generally desirable to add the zinc activator after the non-productive stages are complete. Additionally, since the disulfoxide crosslinking agent acts as a curing agent, the temperature of the mix once the disulfoxide crosslinking agent has been added may be maintained at or below 160° C. to minimize premature vulcanization.

Without intending to limit the scope of the exemplary embodiment the following examples illustrate preparation and use of the disulfoxide crosslinking agent.

EXAMPLE

In a 100 ml glass bottle, 1.0 g (3.53 mmol) 1,4-Bis[[(tert-butyl)thio]methyl]benzene is dissolved in 30 mL dichloromethane and cooled to 0° C. in an ice bath. To this is added, 1.68 g meta-chloroperoxybenzoic acid (73% purity, 7.11 mmol) in 30 mL dichloromethane slowly over 30 minutes. The reaction is stirred overnight. 1.0 g (90% isolated yield) of the corresponding bis-sulfoxide product is isolated after a basic aqueous workup at 96% purity by 1H-NMR.

Each of the references mentioned herein is hereby incorporated by reference in its entirety.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A composition comprising:
a product of a reaction of a crosslinking agent and an elastomer containing olefinic unsaturation, the crosslinking agent comprising at least two functional groups that are each capable of forming a bond with an associated elastomer containing olefinic unsaturation, at least one of the at least two functional groups comprising a sulfoxide group, the at least two functional groups being linked by a linking moiety.

2. The composition of claim 1, wherein the crosslinking agent is a disulfoxide crosslinking agent in which at least two of the functional groups that are capable of forming a bond with an associated elastomer each includes a sulfoxide group.

3. The composition of claim 2, wherein the disulfoxide crosslinking agent comprises the general structure of Formula (I):

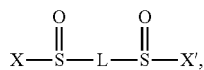

Formula (I)

where X and X' are each a reactive leaving group which is capable of forming a bond with the elastomer containing olefinic unsaturation, where X and X' may be the same or different; and
L represents the linking moiety.

4. The composition of claim 3, where each X independently represents a hydrocarbyl group.

5. The composition of claim 4, where each X independently represents a hydrocarbyl group is of the general form:

where $R^1$, $R^2$, and $R^3$ are each independently H or a hydrocarbyl group.

6. The composition of claim 5, wherein at least one of $R^1$, $R^2$, and $R^3$ is a methyl group.

7. The composition of claim 3, wherein L is an hydrocarbylene group, which optionally includes at least one sulfoxide group.

8. The composition of claim 3, wherein L has the general structure:

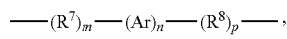

where each of $R^7$ and $R^8$ is independently an alkylene group or alkenylene group;
Ar is an optionally-substituted arylene group; each of m, n, and p is ≥0, and at least one of m, n, and p is ≥1.

9. The composition of claim 8, wherein n is ≥1.

10. The composition of claim 9, wherein m is 1 and p is 1.

11. The composition of claim 8, wherein each of $R^7$ and $R^8$ is independently an alkylene group with a hydrogen on a β carbon.

12. The composition of claim 1, wherein the crosslinking agent comprises the structure:

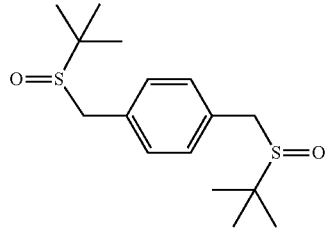 [SMILES: CC(C)(C)S(=O)Cc1ccc(CS(=O)C(C)(C)C)cc1]

13. The composition of claim 1, wherein the elastomer comprises at least one of polyisoprene; polybutadiene; styrene-butadiene copolymer; and mixtures and copolymers thereof.

14. The composition of claim 1, further comprising at least one of:
a reinforcing filler;
at least one processing aid; and
a cure package comprising a sulfur-based vulcanizing agent.

15. The composition of claim 14, wherein the at least one reinforcing filler comprises a reinforcing filler selected from carbon black and silica.

16. A tire formed, at least in part, from the composition of claim 1.

17. A method of forming a rubber composition comprising:
blending an elastomer containing olefinic unsaturation with a crosslinking agent having the general structure of Formula (I):

Formula (I)

where X and X' are each a reactive leaving group which is capable of forming a bond with the elastomer containing olefinic unsaturation, where X and X' may be the same or different, and L represents a linking moiety, at a temperature at which crosslinking of the elastomer by the crosslinking agent occurs.

18. The method of claim 17, wherein the linking moiety comprises at least one sulfoxide group.

19. The method of claim 17, further comprising:
combining at least one of a reinforcing filler and a plasticizer with the elastomer and the crosslinking agent.

* * * * *